Figure 1:
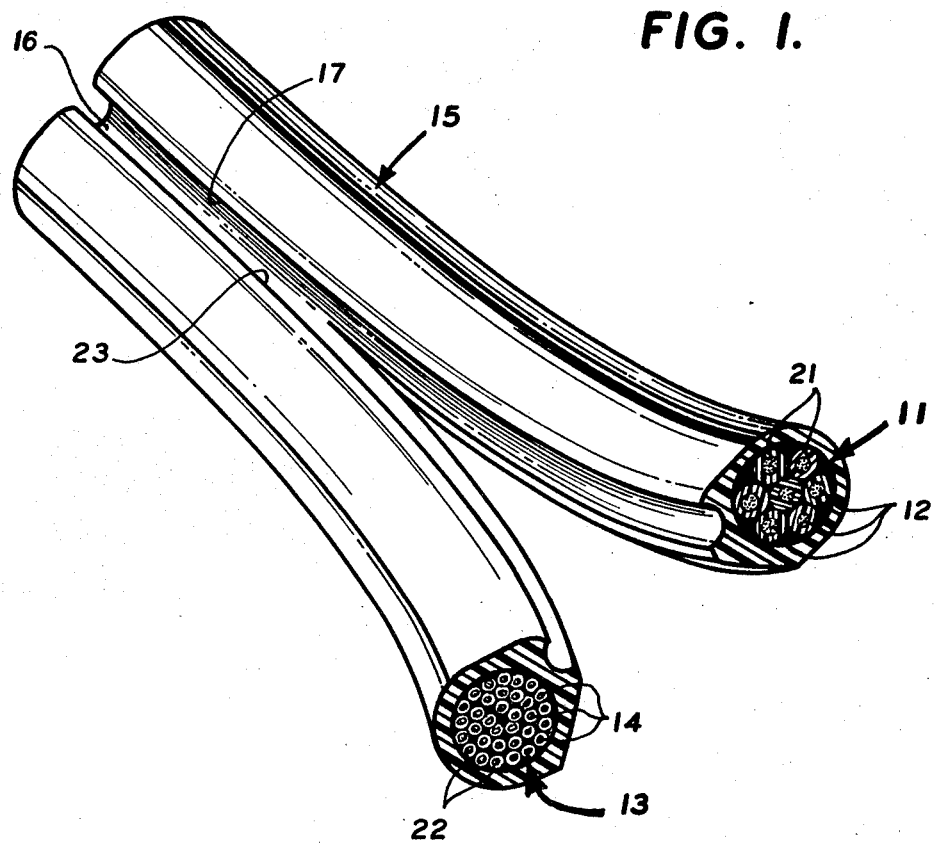

United States Patent [19]
Bayes et al.

[11] 3,715,458
[45] Feb. 6, 1973

[54] ELECTRICAL CABLE STRUCTURE
[75] Inventors: Lowell D. Bayes; Robert B. Cole, both of Richmond, Ind.
[73] Assignee: Belden Corporation, Chicago, Ill.
[22] Filed: Nov. 1, 1971
[21] Appl. No.: 194,743

[52] U.S. Cl. ............ 174/113 R, 174/117 R, 174/115
[51] Int. Cl. ................................................ H01b 7/04
[58] Field of Search ........ 174/117 R, 1 R, 115, 113 R

[56] References Cited
UNITED STATES PATENTS
2,787,653   4/1957   Ormerod .......................... 174/115 X
3,033,916   5/1962   Scofield ........................... 174/115 X FOREIGN PATENTS OR APPLICATIONS
1,515,372   6/1969   Germany ......................... 174/113 R Primary Examiner—E. A. Goldberg
Attorney—William E. Anderson et al.

[57] ABSTRACT

An electrical cable structure is described in which two separate cables are enclosed within a single extruded jacket. The jacket includes a recess extending along its outer surface equidistant from and parallel with the first and second cables. The recess is of a configuration to form a retainer for a further cable inserted in the recess.

3 Claims, 2 Drawing Figures

PATENTED FEB 6 1973

3,715,458

INVENTORS
LOWELL D. BAYES
ROBERT B. COLE
BY
Fitch, Even, Tabin
& Luedeka
ATTORNEYS

ELECTRICAL CABLE STRUCTURE

This invention relates to electrical conductors and, more particularly, to an improved electrical cable structure.

In many hospitals, electrical cable structures are utilized which comprise a pair of electrical cables extending between a central monitoring station and a remote station, such as a hospital room, where various patient conveniences are provided or where physiological functions of the patient are measured. One of the cables comprises a plurality of electrical conductors, each individually sheathed by insulation for carrying communication signals to and from the particular remote station to the central monitoring station. A second cable, comprising a plurality of individually insulated sheathed electrical conductors, carries electrical power to equipment located at the remote station. For convenience and safety, the two electrical cables are typically contained within a jacket of insulating material, which also maintains separation between the two cables to reduce the danger of electrical shock due to shorts between conductors in the two groups.

Electrical cable structures of the type described have previously been manufactured by producing the two cables (power and communication) individually, and enclosing them in separate insulating jackets. Short lengths of parallel tubes joined together are manufactured separately by extrusion. The two cables, of which the outer diameters are substantially less than the inner diameters of the parallel tubes, are then inserted through as many lengths of the parallel tubes as needed to cover the length of the cables. The result is a pair of loose fitting outer tubes comprised of a series of loose segments covering the jacketed cables. The segments may be taped or otherwise secured together to make a more cohesive assembly. An additional smaller tube has often been extruded as an integral part of the dual tubes to allow installation of a third cable for telephone equipment, thus allowing for the power cable, the communications cable, and the telephone cable to be enclosed within a series of single extruded lengths of parallel tubes.

The foregoing described structure suffers from several disadvantages. Typically, the size of the electrical cable structure is often substantial and unwieldy. High production and installation costs result from the number of separate manufacturing and assembly steps required. Finally, installation or removal of the telephone cable involve disconnection of the telephone cable and a consequent interruption of telephone communications, as well as inconvenience to the installers.

An object of the invention is to provide an improved cable structure.

Another object of the invention is to provide an electrical cable structure which is lower in cost to manufacture and install than prior art structures.

It is another object of the invention to provide an electrical cable structure of smaller size than prior art constructions.

A further object of the invention is to provide an electrical cable structure including two electrical cables and means for accommodating a telephone cable in a manner such that the telephone cable can be readily installed or removed.

Figure 2:
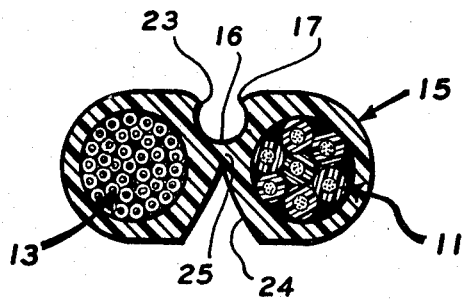

Other objects of the invention will become apparent to those skilled in the art from the following description, taken in connection with the accompanying drawings wherein:

FIG. 1 is a perspective view illustrating a section of an electrical cable structure constructed in accordance with the invention; and FIG. 2 is a cross sectional view of the cable structure of FIG. 1.

Very generally, the electrical cable structure of the invention comprises a first cable 11 including a plurality of first electrical conductors 12. The cable structure also includes a second cable 13 having a plurality of second electrical conductors 14. A jacket 15 of flexible insulating material is extruded about the first and second cables to surround each of the cables with the first and second cables being in generally parallel relation. The jacket is formed with a recess 16 therein extending along the jacket parallel with the first and second cables and substantially equidistant therefrom. The recess has a pair of lips 17 and 23 extending along the open sides thereof to form a retainer for a further cable inserted in the recess.

Referring now more particularly to the drawings, FIG. 1 illustrates a section of the electrical cable structure of the invention showing the cable structure partially separated for reasons which will be explained. The illustrated cable structure is specifically designed for use in a hospital as previously described, although the invention is not limited thereto.

In the illustrated electrical cable structure, a plurality of electrical conductors are utilized for carrying control and communication signals to and from a remote hospital station and a central monitoring station. Patient functions such as pulse rate, blood pressure, etc., and patient signals for aid, can be monitored electronically and observed at a central control station. In addition to control and communication signals, power must be provided to the remote patient control station for operating the equipment thereat. Accordingly, a plurality of electrical conductors for carrying power to the patient control station are also included within the electrical cable structure of the invention.

The power cable is illustrated as the cable 11 and is comprised of a plurality of electrical conductors 12, each of which is surrounded by a sheath 21 of suitable insulation. Similarly, the control and communication cable 13 is comprised of a plurality of electrical conductors 13, each of which is surrounded by a sheath 22 of a suitable insulating material.

In manufacturing the electrical cable structure of the invention, the two cables 11 and 13 are passed through a suitable extrusion apparatus of a type which is generally known in the art and which extrudes the jacket 15 to completely surround each of the cables. The extrusion apparatus is designed with a die of a cross section shaped to produce the desired cross section of the jacket as subsequently described. The material of which the jacket 15 is comprised may be of any suitable type providing the desired flexibility and the necessary electrical and mechanical protection for the cable. By extruding the jacket directly on the two cables 11 and 13, the overall size of the cable structure cross section is minimized while at the same time providing suitable separation between the cables to reduce the danger of electrical shock due to shorts between conductors in the two cables.

In the illustrated embodiment, the jacket is formed with the recess 16 running along its length parallel to and equidistant from the cables 11 and 13. The recess 16 is of generally circular cross section with an open side along which a pair of lips 17 and 23 extend. The recess 16 is for accommodating a telephone cable when desired. The telephone cable is installed by pressing it into the recess 16 past the lips 17 and 23. By flexing the cable cross-ways, the lips can be moved slightly apart, or the lips themselves may flex sufficiently to allow insertion of the cable. The telephone cable may be removed merely by pulling to withdraw it from the recess. Thus, removal or installation of a telephone cable is possible without disconnection of the other two cables 11 and 13 as would be required if the recess was closed.

In addition to the recess 16, a further recess 24 is suitably formed in the cable structure. The recess 24 in the illustrated cable is of a generally V-shaped cross section and extends almost to the bottom of the recess 16. The recess 24 facilitates separation of the lips 17 and 23 during insertion and removal of the telephone cable.

A relatively thin web 25 is left in the region of the cable structure between the recess 16 and the recess 24. The thickness of the web 25 is selected in accordance with the material of which the jacket is comprised in order that the two cables may be manually separated as illustrated in FIG. 1. This facilitates termination of the cable at either the remote station or the central station.

By providing a cable structure as described, power and communication cables are contained under a common jacket, and yet electrical separation is adequately maintained. Moreover, a telephone cable may be optionally included in the cable structure very readily, merely by pressing the telephone cable into the recess 16 provided therefor. The telephone cable is also readily removed merely by pulling. Due to the thin web which separates the portion of the jacket which includes the respective cables, the cable structure can be readily separated as illustrated by manual tearing, and thus may be readily terminated.

It may therefore be seen that the invention provides an improved electrical cable structure. The cable structure of the invention achieves, in a single integral unit, a high level of safety which is particularly suitable for medical use, and also provides superior convenience and flexibility. Substantial cost reductions in manufacturing over prior art designs are achieved, and a smaller overall size also results.

Various modifications of the invention in addition to those shown and described herein will become apparent to those skilled in the art from the foregoing discussion and accompanying drawings. Such modifications are intended to fall within the scope of the appended claims.

What is claimed is:

1. An electrical cable structure comprising, a first cable, a second cable, a jacket of flexible insulating material extruded about said first and second cables to surround each of said cables with said first and second cables being in untwisted generally parallel relation, said jacket being formed with a recess therein extending along said jacket parallel with said first and second cables and substantially equidistant therefrom, said recess having a pair of lips extending along the open side thereof to form a retainer for a further cable inserted in said recess, a further recess formed in said jacket opposite said first named recess, said further recess being of a different shape than said recess and being of a depth sufficient to provide a manually severable web between said recesses, extending the length of said jacket to allow manual separation of said cables.

2. An electrical cable structure according to claim 1 wherein said further recess has a generally V-shaped cross sectional outline.

3. An electrical cable structure comprising, a first cable including a plurality of first electrical conductors, a second cable including a plurality of second electrical conductors, each of said first electrical conductors and said second electrical conductors having an insulating sheath, a jacket of flexible insulating material extruded directly about said first and second cables to surround each of said cables with said first and second cables being in generally parallel relation, said jacket being formed with a recess therein extending along said jacket parallel with said first and second cables substantially equidistant therefrom, said recess having a pair of lips provided disposed along opposite edges of the open side of said recess to form a retainer for a further cable inserted in said recess, a second recess provided in said jacket opposite said first named recess, said second recess being of generally V-shaped cross sectional outline and being of a depth sufficient to provide a manually severable web between said recesses extending the length of said jacket to allow manual separation of said cables.

* * * * *